United States Patent [19]

Wilkinson

[11] Patent Number: 4,742,386

[45] Date of Patent: May 3, 1988

[54] METHOD AND APPARATUS FOR ENCODING COMPONENT DIGITAL VIDEO SIGNALS SO AS TO COMPRESS THE BANDWIDTH THEREOF, AND FOR DECODING THE SAME

[75] Inventor: James H. Wilkinson, Yokohama, Japan

[73] Assignee: Sony Corporation, Tokyo, Japan

[21] Appl. No.: 22,965

[22] Filed: Mar. 6, 1987

[30] Foreign Application Priority Data

Apr. 2, 1986 [GB] United Kingdom ................. 8608081

[51] Int. Cl.$^4$ ...................... H04N 11/04; H04N 11/16
[52] U.S. Cl. ......................................... 358/13; 358/23; 358/31
[58] Field of Search ................... 358/13, 21 R, 23, 15, 358/16, 31

[56] References Cited

U.S. PATENT DOCUMENTS

| | | | |
|---|---|---|---|
| 2,736,859 | 2/1956 | Pritchard et al. | 358/16 |
| 4,051,516 | 9/1977 | Weston | 358/13 |
| 4,322,739 | 3/1982 | Drewery et al. | 358/13 |
| 4,464,685 | 8/1984 | Wilkinson | 358/13 |
| 4,589,011 | 5/1986 | Rzeszewski | 358/16 |
| 4,660,072 | 4/1987 | Fukinuki | 358/16 |

Primary Examiner—John W. Shepperd
Attorney, Agent, or Firm—Lewis H. Eslinger

[57] ABSTRACT

A component digital video signal is encoded such that first and second color components CB, CR are modulated on the lower sideband of a carrier at the Nyquist frequency of the luminance component Y. The encoding method involves alternately adding and subtracting the luminance and color component signals Y+C, Y−C, Y+C, Y−C, (etc) and changing the phase relationship between this addition and subtraction for the first and second color components every field, so that in each alternate field the addition and subtraction operations are in phase for both color components CB, CR and in every other field, the operations are out of phase. Upon decoding, the encoded video signal is comb filtered to recover the luminance component Y and color components CB, CR, and the correct phase for the color components (CB, CR) is restored by a phase alternation operation which is inverse to that applied during encoding.

15 Claims, 7 Drawing Sheets

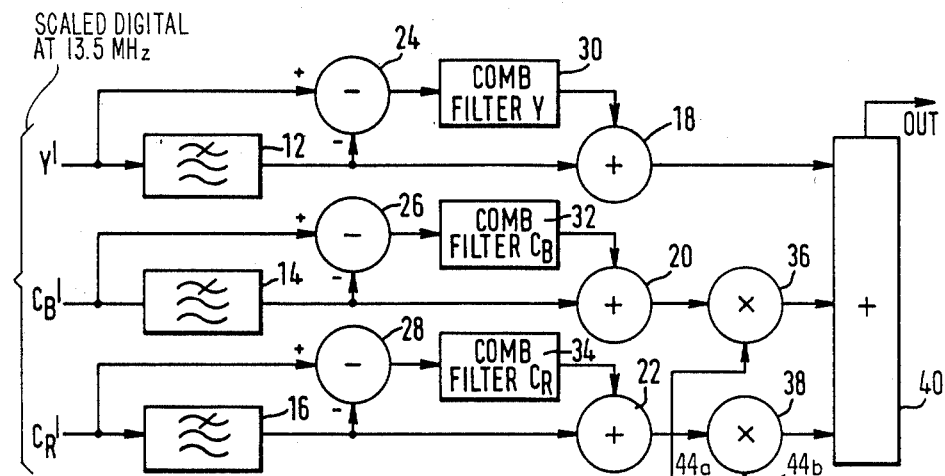
FIG. 7.
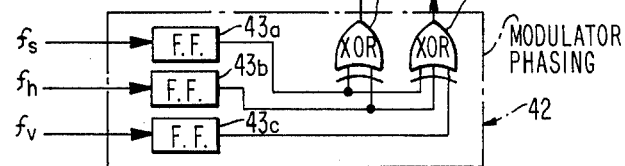
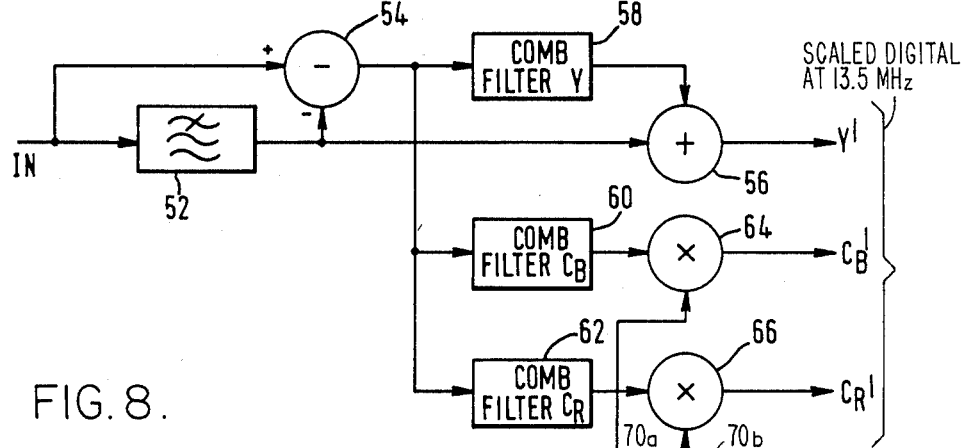
FIG. 8.
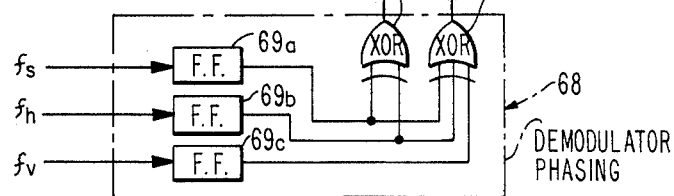

METHOD AND APPARATUS FOR ENCODING COMPONENT DIGITAL VIDEO SIGNALS SO AS TO COMPRESS THE BANDWIDTH THEREOF, AND FOR DECODING THE SAME

BACKGROUND OF THE INVENTION

1. Field of the Invention

This invention relates to methods of and apparatus for encoding and decoding component digital video signals.

2. Description of the Prior Art

There has been considerable interest in video signal coding schemes which compress the overall bandwidth of a transmitted video signal. For example, in the 4:2:2 CCIR 601 coding standard, a bandwidth of 13.5 MHz is divided into 6.75 MHz for the luminance component and 3 375 MHz for each of the color components. In order to provide a half-rate system, in other words one with half of the previous overall bandwidth, it has been proposed to reduce this standard to 2:1:1, which halves the available bandwidths for the luminance and color components. Although such reduced bandwidth color components can provide reasonable quality, there is insufficient bandwidth for the luminance component since the Nyquist frequency will be 3.375 MHz and it has been found that at least 5 MHz and preferably more is necessary for good quality reproduction. Various other methods for compressing the video signal into a reduced bandwidth have been proposed, but none has been fully satisfactory since each proposed method has resulted in some disadvantageous effect.

In the conventional PAL and NTSC coding systems, if the CCIR 601 sampling standard of 13.5 MHz for the luminance signal is to be applied, it is found that although both systems can be encoded and decoded fully in the digital domain, neither of the systems is optimised since the sub-carrier relationship to sampling frequency is not simple and the color components are not optimally located within the 6.75 MHz Nyquist bandwidth.

A further factor to be taken into account is that any coding scheme for compressing video signals should be compatible with, or result in minimal adaptation of, existing ancillary equipment. For example, in a digital video tape recorder (DVTR), it should be possible to manipulate the carrier phase for editing operations and for slow motion and shuttle replay.

SUMMARY OF THE INVENTION

One object of the present invention is to provide an improved method of encoding component digital video signals.

Another object of the present invention is to provide a method of encoding component digital video signals in which a phase relationship between a phase alteration of first and second color component signals is changed every field.

Another object of the present invention is to provide an improved apparatus for encoding component digital video signals.

Another object of the present invention is to provide a method and apparatus for decoding component digital video signals.

According to the present invention there is provided a method of encoding a component digital video signal which comprises a luminance signal and first and second color component signals, the color component signals being modulated on the lower sideband of a carrier at the luminance signal Nyquist frequency, the method being characterised by:

alternating line-by-line at a predetermined frequency the phase of the first color component signal;

alternating line-by-line at the predetermined frequency the phase of the second color component signal;

changing the phase relationship between the phase alternation for the first and second color component signals every field so that the instantaneous phases of both color component signals are the same in each alternate field and are opposite in every other field; and combining the first and second phase-alternating color component signals with the luminance signal to provide the encoded component digital video signal.

According to the present invention there is also provided a method of decoding an encoded component digital video signal of the type provided by the above-defined encoding method, the decoding method comprising:

separating low and high frequency portions of the encoded component video signal, the low frequency portion including substantially only the luminance signal;

comb filtering the high frequency portion with luminance, first color component and second color component comb filters to provide respectively a high frequency portion of the luminance signal, and first and second phase-alternating color component signals;

combining the low frequency portion of the encoded signal with the high frequency portion of the luminance signal so as to recover the luminance signal; and alternating the phase of the first and second phase-alternating color component signals at a predetermined frequency such that the phase alternation relationship changes every field so as to recover the first and second color component signals.

According to the present invention there is also provided apparatus for encoding a component digital video signal which comprises a luminance signal and first and second color component signals, the color component signals being modulated on the lower sideband of a carrier at the luminance signal Nyquist frequency, the apparatus being characterised by:

first phase alternating means for alternating line-by-line at a predetermined frequency the phase of the first color component signal;

second phase alternating means for alternating line-by-line at the predetermined frequency the phase of the second color component signal;

modulator phasing means for changing the phase relationship between the first and second phase alternating means every field so that the instantaneous phases of both color component signals are the same in each alternate field and are opposite in every other field; and combining means for combining the first and second phase-alternating color component signals with the luminance signal to provide the encoded component digital video signal.

According to the present invention there is also provided apparatus for decoding an encoded component digital video signal of the type provided by the above-defined encoding apparatus, the decoding apparatus comprising:

frequency separating means for separating low and high frequency portions of the encoded component video signal, the low frequency portion including substantially only the luminance signal;

luminance, first color component and second color component comb filters for comb filtering the high frequency portion to provide respectively a high frequency portion of the luminance signal, and first and second phase-alternating color component signals;

means for combining the low frequency portion of the encoded signal with the high frequency portion of the luminance signal;

first phase alternating means for alternating line-by-line at a predetermined frequency the first phase-alternating color component signal;

second phase alternating means for alternating line-by-line at a predetermined frequency the second phase-alternating color component signal; and demodulator phasing means for changing the phase relationship between the first and second phase alternating means every field so as to recover the first and second color component signals.

Embodiments of the invention can therefore utilize a coding scheme in which the color component signals are compressed into the luminance bandwidth only. Thus 4:2:2 component digital video signals can be compressed effectively into a 4:0:0 format, resulting in the overall bandwidth required being halved.

In a preferred form of coding scheme, the color components are interleaved between the line harmonics of the luminance signal, in similar manner to that of the NTSC standard. However, the color components are additionally interleaved at the field harmonics level and this allows the color components to be recovered simply and effectively at the decoding stage.

The manner of carrier modulation of the color components is also favourable for DVTR editing and special effects, since in any operation which requires manipulation of the carrier polarity a satisfactory result can be achieved because each carrier element has only two values being phase or polarity variations and each value is surrounded in all dimensions by adjacent elements of opposite polarity. Thus the presently utilized methods for processing composite signals can be readily applied.

The above, and other objects, features and advantages of this invention will be apparent from the following detailed description of illustrative embodiments which is to be read in connection with the accompanying drawings.

BRIEF DESCRIPTION OF THE DRAWINGS

FIG. 7 shows in block diagrammatic form an encoding circuit forming an embodiment of the invention;

FIG. 8 shows in block diagrammatic form a decoding circuit forming another embodiment of the invention;

DESCRIPTION OF THE PREFERRED EMBODIMENTS

Figures 1A, 1B:
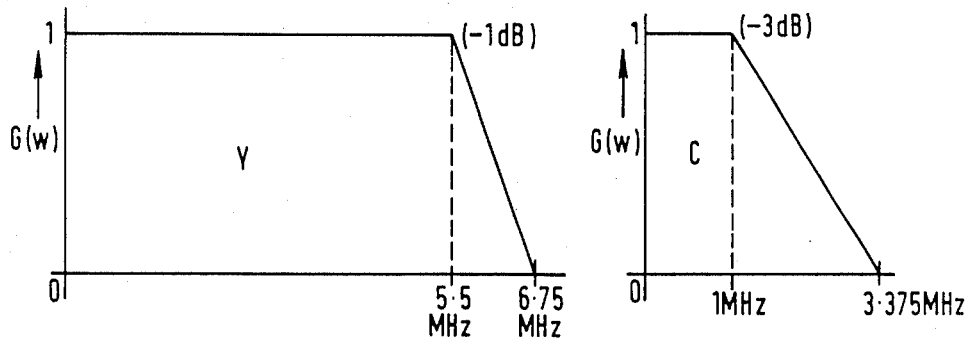
FIGS. 1A and 1B are diagrams showing the respective required bandwidths for luminance component signals and color component signals in a component video signal.

Referring to FIGS. 1A and 1B, the respective frequency requirements for the luminance component Y and the color components C are shown in accordance with the CCIR 601 standard. It will be seen from FIG. 1A that the luminance component Y requires a bandwidth with a nominal cut-off frequency (at −1 dB) of 5.5 MHz and a Nyquist frequency of 6.75 MHz. The gap between the norminal cut-off frequency and the Nyquist frequency is thus about 1.25 MHz. In FIG. 1B, the color components C require a bandwidth nominally cut-off at 1 MHz (at −3 dB) but with a Nyquist frequency at 3.375 MHz.

Figure 2:
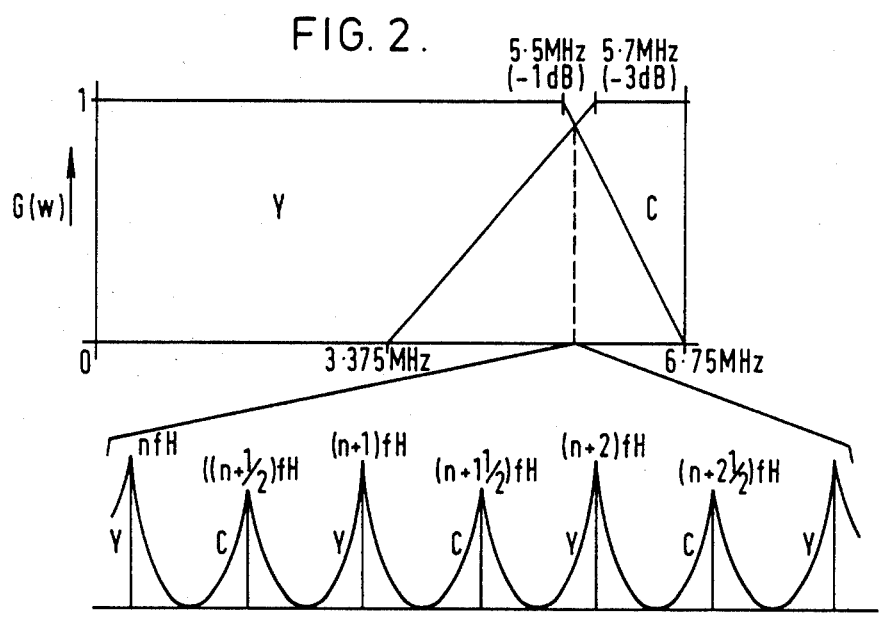
FIG. 2 is a diagram showing the manner in which the luminance and color component signals of FIGS. 1A and 1B may be combined to form a composite signal which can be used in embodiments of the invention.

FIG. 2 shows how the luminance and color component signals of FIGS. 1A and 1B can be combined with the advantageous effect that the color components are at as high a signal frequency as possible. The gap of 1.25 MHz between the nominal cut-off frequency and the Nyquist frequency of the luminance component Y is used to contain one sideband of a color component C. Assuming that the two color components CB, CR are modulated on a Nyquist carrier of approximately 6.75 MHz, then any residual interference can be minimized by ensuring that the spectral components of the luminance and modulated color components are interleaved, as shown in the lower part of FIG. 2 which is a magnified detail of the upper part of the drawing at the equal level intersection between the luminance and color component envelopes. The color components C are modulated to interleave between the line harmonics of the luminance component Y for minimum interference in the crossover band. The interleaving is similar to that used in NTSC, in other words there is a half-line offset for the color components. The luminance component Y are at integral number line harmonics $nf_H$, $(n+1)f_H$, $(n+2)f_H$, . . . (etc.) of the line frequency $f_H$ whereas the color signals C are interleaved at frequencies $(n+\frac{1}{2})f_H$, $(n+1\frac{1}{2})f_H$, $(n+2\frac{1}{2})f_H$, . . . (etc.).

A fundamental difference between the coding scheme of FIG. 2 and systems such as PAL and NTSC is that the color component carrier is outside the luminance bandwidth. This means that separation of the luminance and color components can be readily achieved.

Figure 3:
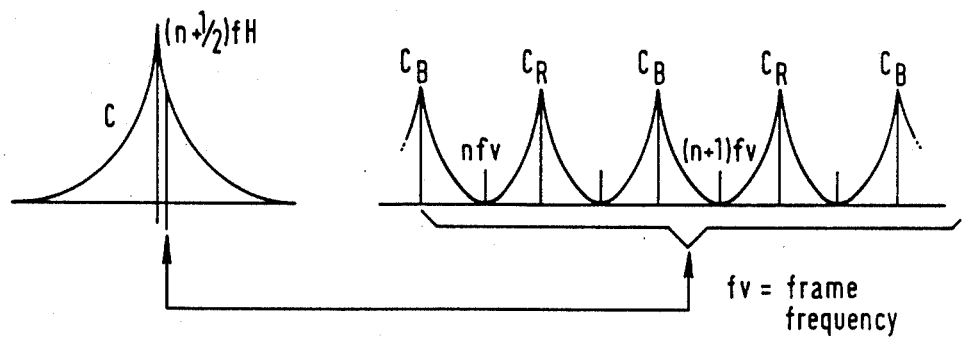
FIG. 3 is a diagram showing the manner in which the color component signals may be included in the composite signal of FIG. 2.

Since both color components CB and CR are single sideband, simple carrier phasing will not be sufficient to separate them from each other. A further level of frequency modulation is used for this purpose. FIG. 3 shows the composition of the color components CB and CR in one of the color line harmonics shown in FIG. 2. It will be seen from FIG. 3 that each color line harmonic, the harmonic $(n+\frac{1}{2})f_H$ being shown, has a spectral content within which the color components CB and CR alternate such that a pair of components CB and CR are positioned between harmonics of the frame frequency $f_v$, for example $nf_v$ and $(n+1)f_v$ as shown. Thus it is possible to separate the color components CB and CR in the time domain, in a similar manner to the $\frac{1}{2}$-line frequency separation in PAL.

Figure 4A:
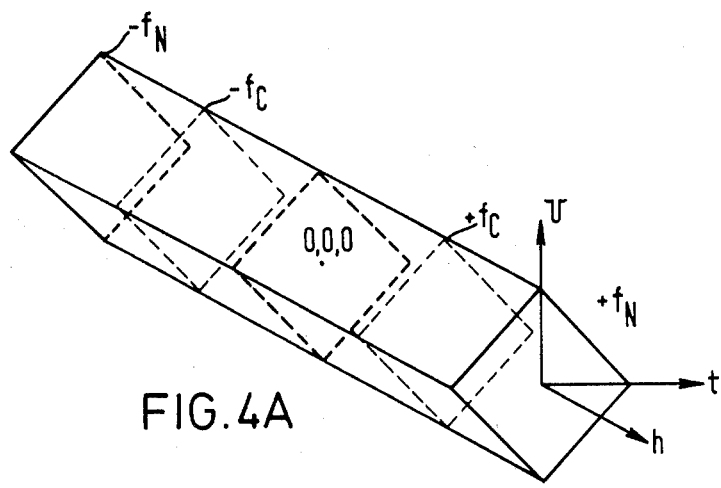
FIG. 4A is a diagram showing in three-dimensional representational form the Nyquist limits of a digital video signal.
Figure 4B:
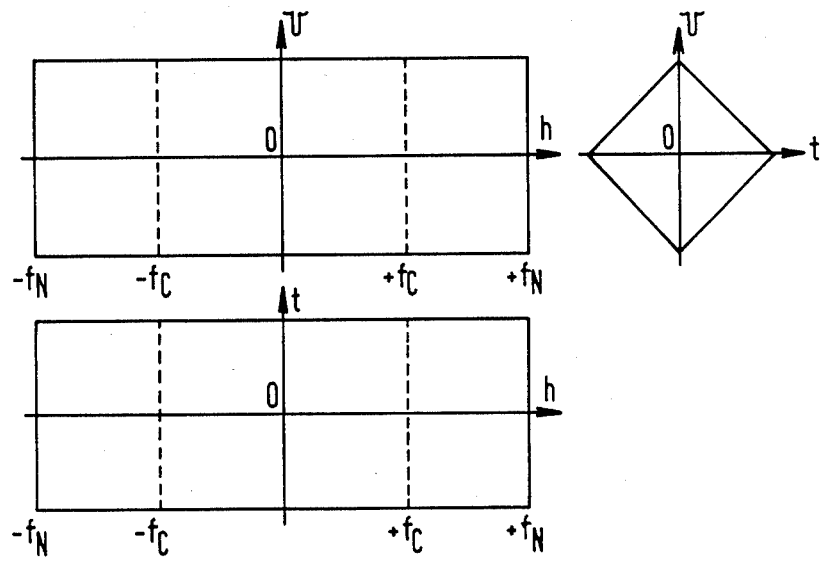
FIG. 4B is a diagram similar to that of FIG. 4A, but as third angle projections of the three-dimensional representation of the Nyquist limits.

A more general way of viewing the inter-relationship between the three components, Y, CB and CR is with the help of the three-dimensional representation of the Nyquist limits of the digital video signal as shown in FIG. 4A and the third-angle projections of the representation shown in FIG. 4B. The three axes are vertical (v), horizontal (h) and time (t). The dotted lines $\pm f_C$ coincide approximately with the color carrier location in NTSC. As far as the video coding scheme of FIGS. 2 and 3 is concerned, that part of the bandwidth between $-f_C$ and $f_C$ contains only the luminance component Y. The remaining parts of the bandwidth between $+f_C$ and the horizontal Nyquist frequency of $+f_N$ (+432 cph for 625 lines and +429 cph for 525 lines) and between $-f_C$ and $-f_N$ are shared between the three components.

Figure 5:
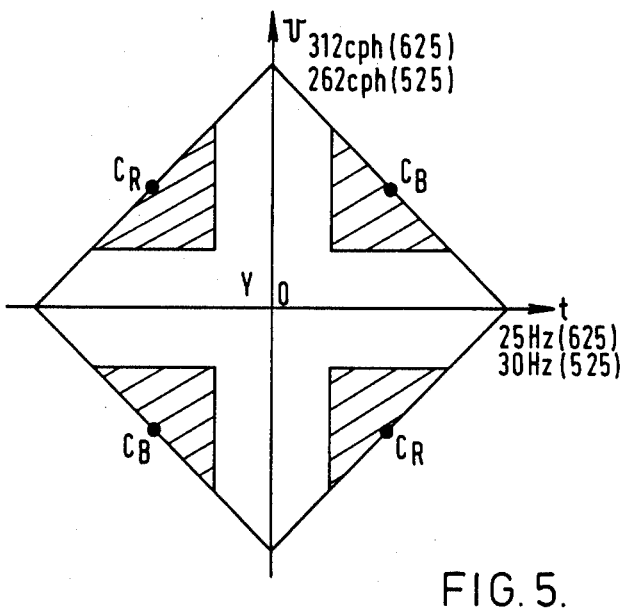
FIG. 5 is a diagram of the v−t third angle projection of FIG. 4B showing near the Nyquist frequency the positions of the luminance and color components of a digital video signal of the type shown in FIGS. 2 and 3.

FIG. 5 shows the location of the luminance component Y and the two color components CB and CR in the v—t projection as shown in FIG. 4B. The luminance component Y is located around the origin, with the color components CB and CR centered on the following points:
for 625 lines
    CB: 156, 12.5; −156, −12.5
    CR: 156, −12.5; −156, 12.5
for v and t respectively;
for 525 lines
    CB: 131, 15; −131, −15
    CR: 131, −15; −131, 15
for v and t respectively.

The two color points for each of the color components CB and CR shown in FIG. 5 are representative of the two points on the positive side of the h-axis. There will be an equivalent mirror-image pair (the mirror image being in both planes) on the negative side of the h-axis. Thus there are four color points for each of the color components CB and CR. It will be seen that these points have half-line offset, being located at ±156 cph and ±12.5 Hz (or ±131 cph and ±15 Hz).

The frequency separation of the components Y, CB and CR as shown in FIG. 5 means that in this part of the signal spectrum, all three components can be fully separated by the use of comb filters, as will be described with reference to FIGS. 7 to 10. Both color components CB and CR have been encoded at the Nyquist limit in all respects since the carriers each lie on the upper bounds of the Nyquist limit of the video signal. As such, the coding scheme makes very efficient use of the available bandwidth.

The modulation carrier for each color component is simply a subtraction or addition of the color difference component CB or CR to the luminance component Y. Horizontally, the modulation is simply as follows:

Y+C, Y−C, Y+C, Y−C, etc.

abbreviated to: + − + − + − . . . .

Figure 6:
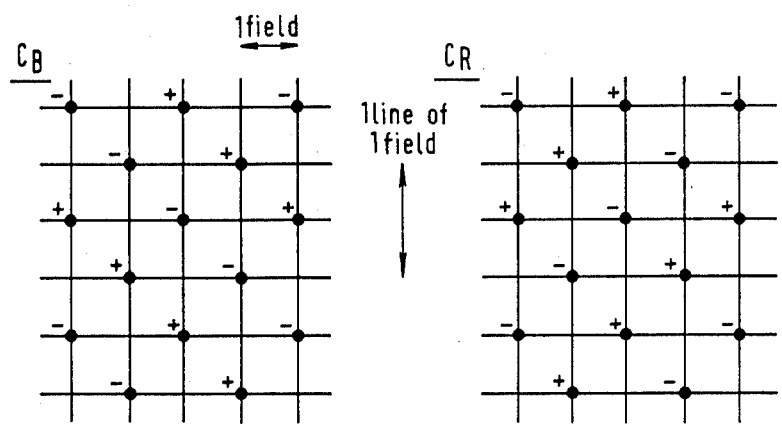
FIG. 6 is a diagram showing the modulation carrier phase for each of the color components of the digital video signal.

The difference between modulation for the color components CB and CR is apparent from FIG. 6 which lists the vertical-time modulation component for each color component. Each modulation carrier is shown line to line and field to field.

The sequences given in FIG. 6 represent the carrier phase for even horizontal samples. For the odd samples, the carrier phase is inverted.

The effect of the described modulation of the color components CB and CR is that, in alternate fields, the sequential addition and subtraction of luminance components and color components proceeds in phase for each color component CB and CR, in other words there is no distinction between the CB and CR modulation. In every other field, however, the sequential addition and subtraction of luminance components and color components is out of phase for each color component CB and CR. Accordingly, each change of field involves an inversion of the modulation carrier.

FIG. 7 shows a circuit suitable for encoding a component video signal as previously described. Scaled values Y', CB', CR' of the luminance component Y and color components CB, CR are applied to respective low-pass filters 12,14,16. The outputs of the low-pass filters 12,14,16, are applied respectively to summing circuits 18,20,22 and to subtracting inputs of subtracting circuits 24,26,28 which also receive the scaled values Y', CB', CR' as inputs. The outputs of the subtracting circuits 24,26,28 are fed to respective comb filters 30,32,34 whose outputs are respectively applied to the summing circuits 18,20,22. The outputs of the summing circuits 20,22 are fed via respective multipliers 36,38 to inputs of a summing circuit 40 which also receives the output of the summing circuit 18. A modulator phasing circuit 42 receives sync signals and provides outputs to the multipliers 36,38 at a predetermined frequency which will generally be the sampling frequency. The summing circuit 40 provides an encoded video signal for transmission or other processing.

In operation, the scaled values Y', CB', CR' are arranged to be at the required frequency, such as 13.5 MHz. The scaled color component signals CB', CR' can be interpolated up to 13.5 MHz either by a simple process such as repeating each sample twice, or by a more complex interpolation scheme relying on spatially and-/or temporarily displaced samples. The low-pass filters 12,14,16 and subtracting circuits 24,26,28 act to separate the component signals into high and low frequency portions. The high frequency portions are comb filtered by the comb filters 30,32,34 and summed with the low frequency portions in the summing circuits 18,20,22. The modulator phasing circuit 42 which receives sync signals at the sample frequency $f_s$, the horizontal frequency $f_h$ and the vertical frequency $f_v$, and which may include flip-flops 43a, 43b and 43c and exclusive-OR circuits 44a and 44b, connected as shown, provides appropriate signals to the multipliers 36,38 to cause the phase of the appropriate color component to be set prior to addition. Thus the multipliers 36,38 act as polarity changing circuits. The modulator phasing circuit 42 is operative to change the color component phase depending on field number, line position and sample position. The effect of these parameters is that the polarities of each of the color components are changed at the predetermined frequency in identical manner for alternate fields and in antiphase for each other field. The summing circuit 40 adds the luminance signal to the phase-adjusted color component signals and provides the encoded video signal for transmission.

The comb filters 30,32,34 may not be necessary in view of the wide frequency separation between the luminance signals and the modulated color component signals. In that case, the scaled luminance component Y' could be applied directly to the summing circuit 40 and the scaled color component signals CB', CR' applied to the summing circuit 40 via the multipliers 36,38.

FIG. 8 shows a circuit suitable for decoding the composite video signal as produced by the encoder of FIG. 7. The video signal is applied to the input of a low-pass filter 52 and to a subtracting circuit 54. The output of the low-pass filter 52 is fed to the subtracting input of the subtracting circuit 54 and to a summing circuit 56. The output of the low-pass filter 52 is a low frequency portion of the video signal and the output of the subtracting circuit 54 is a high frequency portion. The cut-off frequency of the low-pass filter 52 is arranged to be at about the lowest frequency of the color component signals. The high frequency portion is applied via a luminance comb filter 58 to another input of the summing circuit 56. The high frequency portion is also fed via respective color component comb filters 60,62 to respective multipliers 64,66 also receiving signals from a demodulator phasing circuit 68 in response to sync signals. The demodulator phasing circuit 68 may be generally similar to the circuit 42 in that it includes flip-flops 69a, 69b and 6c triggered by the sync signals at the sampling, horizontal and vertical frequencies $f_s$, $f_h$ and $f_v$, respectively, and exclusive-OR circuits 70a and 70b, connected as shown. The summing circuit 56 provides the scaled luminance signal Y' as an output and the multipliers 64,66 respectively provide the scaled color component signal CB', CR' as outputs.

In operation, the circuit first separates that part of the video signal which does not require combing, in other words the portion below the effective frequency range of the color component signals. The low-pass filter 52 can be arranged to roll-off at about 4 MHz for this purpose, so that the combing action only starts to come into effect above that frequency. The low frequency portion only contains the luminance signal and therefore this is obtained by summing that low frequency portion with the high frequency portion combed by the luminance comb filter 58 for retaining only the luminance component signals above 4 MHz. Thus the complete scaled luminance component Y' is recovered at the output of the summing circuit 56.

The high frequency portion of the video signal is also combed by the CB and CR comb filters 60 and 62 for the respective color component signals, and then their original phase is recovered at the predetermined frequency, generally the sampling frequency, by the demodulator phasing circuit 68 acting on the multipliers 64,66 in an inverse manner to that of the modulator phasing circuit 42 in FIG. 7.

Figure 9:
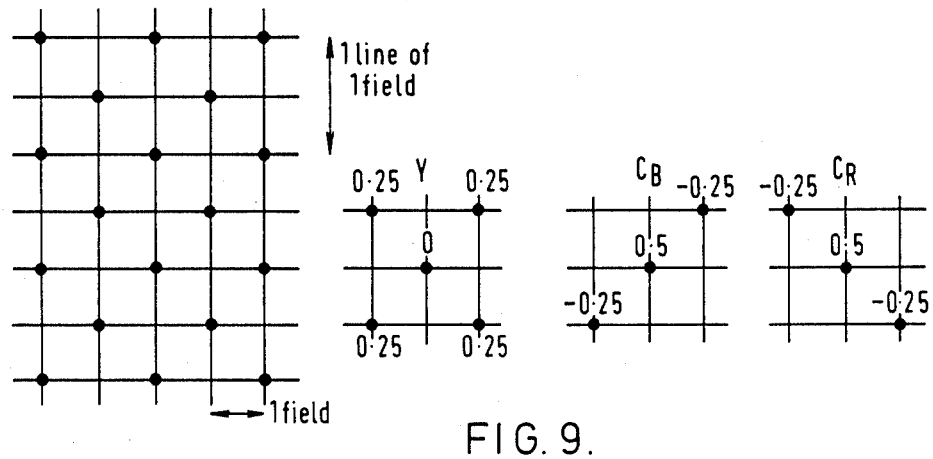
FIG. 9 is a diagram showing the available sample space on the v−t axes in similar manner to that of FIG. 6, and also showing response characteristics of the component separation filters shown in FIGS. 7 and 8.
Figure 10:
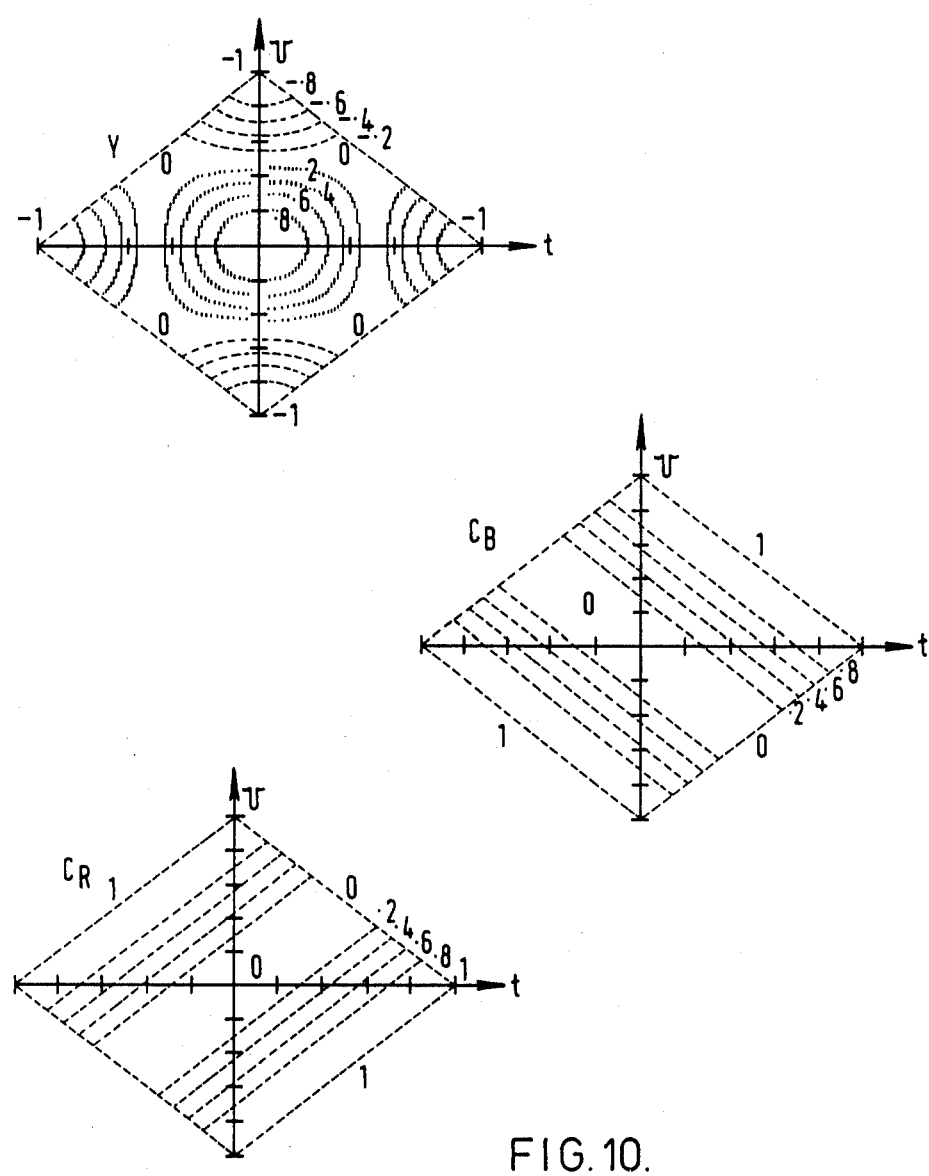
FIG. 10 shows the frequency responses of the component separation filters shown in FIGS. 7 and 8.

The comb filters for the luminance and color component signals may be constituted by field stores with simple coefficients as shown in FIG. 9. The left-hand side of the figure shows a sample space on the v−t axis in similar manner to that shown in FIG. 6 and the field store coefficients are shown on the right-hand side of the figure for the components Y, CB and CR. Comparison of this sample space and the field store coefficients with the carrier components shown in FIG. 6 confirms the correct rejection by each comb filter of the unwanted components. The frequency response of each of the separation comb filters for the luminance and color components is shown in FIG. 10.

In common with other composite coding methods, the addition of three signals will result in an overall increase in magnitude range. Therefore an appropriate scaling must be undertaken to limit the digital signal range to within the conventional 8 bit range, in other words having 256 quantum levels. Clearly, however, the embodiment can be modified for operation at other bit ranges, for example, in 9 or 10 bit systems.

Figure 11:
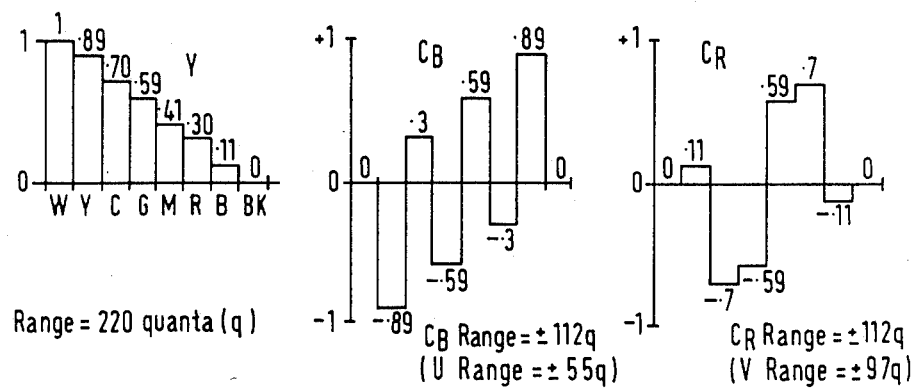
FIG. 11 is a diagram showing component amplitudes for 100% bars in respect of luminance and color components of a video signal, for use in magnitude scaling of the components.

The modulation carrier is such that the peak signals are simply the worst case summation of all components. Therefore given the component amplitudes for 100% bars as shown in FIG. 11, and using PAL scaling values for the components, Y, CB, CR of, respectively, 1, 0.49, 0.87, the digital signal range without further scaling would be as defined in Table 1.

TABLE 1

| Color | White | Yellow | Cyan | Green | Magenta | Red | Blue | Black |
|---|---|---|---|---|---|---|---|---|
| Y | 220 | 194.9 | 154.2 | 129.1 | 90.9 | 65.8 | 25.1 | 0 |
| U' | 0 | ±54.9 | ±18.5 | ±36.4 | ±36.4 | ±18.5 | ±54.9 | 0 |
| V' | 0 | ±15.8 | ±97.4 | ±81.6 | ±81.6 | ±97.4 | ±15.8 | 0 |
| Sum (+ve) | 220 | 265.6 | 270.1 | 247.1 | 208.9 | 181.1 | 95.8 | 0 |
| Sum (−ve) | 220 | 124.2 | 38.3 | 11.1 | −27.1 | −50.1 | −45.6 | 0 |

Figure 12:
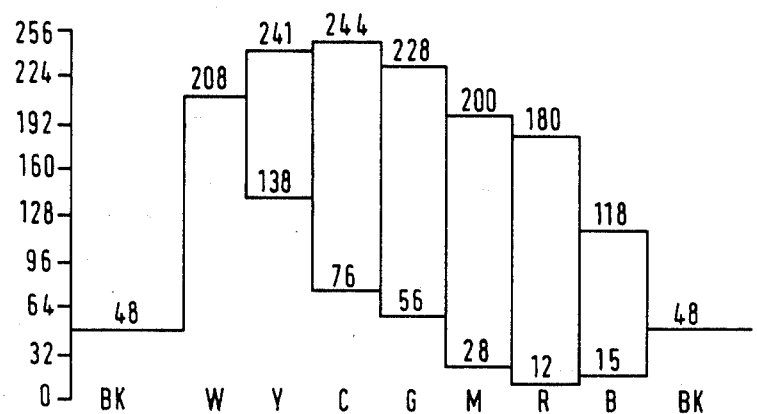
FIG. 12 is a diagram showing the overall scaled color bar waveform of a video signal encoded according to an embodiment of the invention.

The peak range can be accommodated in the 256 quantum levels if the signal range is compressed by the ratio 160/220 and the black level set to 48 quanta. The resulting peak values are then as in FIG. 12 which shows the resulting 100-0-100% color bar waveform.

In summary, the scaling operation firstly involves scaling the color components CB and CR by 0.49 to 0.87 respectively, then applying a scaling factor of 160/220 to all these components, and finally shifting up by 48 quanta. This results in the FIG. 12 color bar waveform.

The signal range of 12 to 244 represents an overload margin of 2 dB and is thus almost identical to the range of the original CCIR 601 overload margin.

Unlike conventional analog signals, this does not need a sync waveform as this will be available as a digital header code.

In conclusion, the coding scheme utilised in the above-described embodiments offers an attractive and simple alternative to other schemes, and may be satisfactorily employed in any area requiring some reduction in bandwidth. The scheme is also applicable to high definition digital systems, as long as such systems use an interleaved scanning raster.

As mentioned above, editing and stunt mode techniques in DVTR operations can present difficult processing requirements for conventional encoding methods, such as NTSC. In contrast, the present coding technique is simply related to the selected sampling frequency in both 625 and 525 line formats. By inspection of the FIG. 6 modulation carrier phase diagram, it can be seen that in any operation which requires manipulation of the carrier polarity, a satisfactory result can be achieved because each carrier element has only two values, and each value is immediately adjacent, in the horizontal and vertical directions, to adjacent elements of opposite polarity.

If color phase inversion is required for any line or field, this can be practically achieved by filtering off the high band components and simply inverting the signal and adding to the low-pass remainder.

With reference to possible interaction between original PAL and NTSC composite signals when converted to this new coding, it seems unlikely that any serious effects would result because the difference between the sub-carrier frequencies is unlikely to produce any low frequency harmonics. The only combination which might cause a problem is an intermodulation beat between the second harmonic of the NTSC sub-carrier with the sampling frequency at approximately 400 kHz. However, such a harmonic would also cause beat effects in the original sampling and so presents a more general system problem rather than one related specifically to this coding technique.

Whereas field stores need to be provided in the decoding apparatus (and possibly also in the encoding apparatus, if required) to provide the field frequency interleaving of color components, the optimum decoding of PAL and NTSC signals also requires the provision of field stores. Moreover, the implementation of such field stores is now possible at low cost and therefore the use of field stores would only appear to be disadvantageous if a number of codes and decoders were to be run in tandem, causing possible loss of synchronisation with the sound.

The coding scheme as described above presents a solution to the problem of designing a half-rate code format without the disadvantages associated with the previously-proposed solutions.

The system described could be adapted to analog use, but in that case both sidebands of the color carrier would need to be transmitted.

Although illustrative embodiments of the invention have been described in detail herein with reference to the accompanying drawings, it is to be understood that the invention is not limited to those precise embodiments, and that various changes and modifications can be effected therein by one skilled in the art without department from the scope and spirit of the invention as defined by the appended claims.

I claim:

1. A method of encoding a component digital video signal which comprises a luminance signal and first and second color component signals, the color component signals being modulated on the lower sideband of a carrier at the luminance signal Nyquist frequency, the method being characterised by:
   alternating line-by-line at a predetermined frequency the phase of the first color component signal;
   alternating line-by-line at the predetermined frequency the phase of the second color component signal;
   changing the phase relationship between the phase alternation for the first and second color component signals every field so that the instantaneous phases of both color component signals are the same in each alternate field and are opposite in every other field; and
   combining the first and second phase-alternating color component signals with the luminance signal to provide the encoded component digital video signal.

2. A method according to claim 1 wherein the luminance and color component signals are sampled at a sampling frequency, and the predetermined frequency equals the sampling frequency.

3. A method according to claim 1 wherein the luminance and color component signals represent scaled values of the luminance and color components.

4. A method according to claim 1 wherein each of the luminance and first and second color component signals is separated into low and high frequency portions, and the high frequency portions are comb filtered by respective comb filters.

5. A method of decoding an encoded component digital video signal of the type provided by the method of claim 1, the decoding method comprising:
   separating low and high frequency portions of the encoded component video signal, the low frequency portion including substantially only the luminance signal;
   filtering the high frequency portion with luminance, first color component and second color component comb filters to provide respectively a high frequency portion of the luminance signal, and first and second phase-alternating color component signals;
   combining the low frequency portion of the encoded signal with the high frequency portion of the luminance signal so as to recover the luminance signal; and
   alternating the phase of the first and second phase-alternating color component signals at a predetermined frequency such that the phase alternation relationship changes every field so as to recover the first and second color component signals.

6. A method according to claim 5 wherein the predetermined frequency equals a sampling frequency during signal encoding.

7. Apparatus for encoding a component digital video signal which comprises a luminance signal and first and second color component signals, the color component signals being modulated on the lower sideband of a carrier at the luminance signal Nyquist frequency, the apparatus being characterised by:
   first phase alternating means for alternating line-by-line at a predetermined frequency the phase of the first color component signal;
   second phase alternating means for alternating line-by-line at the predetermined frequency the phase of the second color component signal;
   modulator phasing means for changing the phase relationship between the first and second phase alternating means every field so that the instantaneous phases of both color component signals are the same in each alternate field and are opposite in every other field; and
   combining means for combining the first and second phase-alternating color component signals with the luminance signal to provide the encoded component digital video signal.

8. Apparatus according to claim 7 wherein the luminance and color component signals are sampled at a sampling frequency, and the predetermined frequency equals the sampling frequency.

9. Apparatus according to claim 7 comprising means for scaling the luminance and color components to produce said luminance and color component signals.

10. Apparatus according to claim 7 comprising frequency separating means for separating each of the luminance and first and second color component signals into low and high frequency portions, comb filters for comb filtering each of the high frequency portions, and combining means for combining each of the low frequency and combed high frequency portions prior to phase alternation.

11. Apparatus according to claim 10 wherein each of the comb filters comprises a respective field store.

12. Apparatus for decoding an encoded component digital video signal of the type provided by the apparatus of claim 7, the decoding apparatus comprising:
frequency separating means for separating low and high frequency portions of the encoded component video signal, the low frequency portion including substantially only the luminance signal;
luminance, first color component and second color component comb filters for comb filtering the high frequency portion to provide respectively a high frequency portion of the luminance signal, and first and second phase-alternating color component signals;
means for combining the low frequency portion of the encoded signal with the high frequency portion of the luminance signal;
first phase alternating means for alternating line-by-line at a predetermined frequency the first phase-alternating color component signal;
second phase alternating means for alternating line-by-line at a predetermined frequency the second phase-alternating color component signal; and
demodulator phasing means for changing the phase relationship between the first and second phase alternating means every field so as to recover the first and second color component signals.

13. Apparatus according to claim 12 wherein the predetermined frequency equals a sampling frequency during signal encoding.

14. Apparatus according to claim 12 or claim 13 wherein each of the comb filters comprises a respective field store.

15. Apparatus according to claim 14 wherein the luminance field store has the coefficients:

| | |
|---|---|
| 0.25 | 0.25 |
| 0 | |
| 0.25 | 0.25 | the first color component field store has the coefficients:

| | |
|---|---|
| 0 | $-0.25$ |
| 0.5 | |
| $-0.25$ | 0 | and the second color component field store has the coefficients:

| | |
|---|---|
| $-0.25$ | 0 |
| 0.5 | |
| 0 | $-0.25$ |

* * * * *